United States Patent
Lustig et al.

(10) Patent No.: US 6,475,581 B2
(45) Date of Patent: Nov. 5, 2002

(54) CLAY COATINGS FOR THERMOPLASTIC POLYMERIC RESINS OR FILMS

(75) Inventors: Steven Raymond Lustig, Landenberg, PA (US); Eric M. Smith, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 23 days.

(21) Appl. No.: 09/741,706

(22) Filed: Dec. 20, 2000

(65) Prior Publication Data

US 2002/0006518 A1 Jan. 17, 2002

Related U.S. Application Data

(60) Provisional application No. 60/172,957, filed on Dec. 21, 1999.

(51) Int. Cl.[7] .......................... B32B 5/16; B32B 27/06; B32B 27/36
(52) U.S. Cl. ............... 428/36.6; 428/36.7; 428/323; 428/324; 428/331; 428/402; 428/446; 428/454; 428/480; 427/299; 427/301; 427/322; 427/532; 427/533; 427/535; 427/536; 427/540
(58) Field of Search .......................... 428/36.6, 36.7, 428/323, 324, 331, 402, 446, 454, 480; 427/299, 301, 322, 532, 533, 535, 536, 540

(56) References Cited

U.S. PATENT DOCUMENTS

| | | | | |
|---|---|---|---|---|
| 5,244,729 A | * | 9/1993 | Harrison et al. | 428/331 |
| 5,571,614 A | * | 11/1996 | Harrison et al. | 428/331 |
| 5,667,886 A | * | 9/1997 | Gough et al. | 427/384 |
| 5,853,830 A | | 12/1998 | McCaulley et al. | |
| 5,882,798 A | | 3/1999 | Hubbard et al. | |
| 5,925,428 A | | 7/1999 | Hubbard et al. | |
| 5,942,298 A | * | 8/1999 | Sakaya et al. | 427/172 |
| 6,013,128 A | * | 1/2000 | Hubbard et al. | 106/600 |

FOREIGN PATENT DOCUMENTS

| | | |
|---|---|---|
| EP | 0518646 A1 | 12/1992 |
| EP | 0778153 A1 | 6/1997 |
| EP | 0805177 A2 | 11/1997 |
| JP | 10-244613 A | 9/1998 |
| WO | WO 97/44379 A1 | 11/1997 |
| WO | WO 97/47694 A1 | 12/1997 |
| WO | WO 97/47695 A1 | 12/1997 |
| WO | WO 98/56861 A1 | 12/1998 |

* cited by examiner

Primary Examiner—Vivian Chen

(57) ABSTRACT

A coated substrate and methods of making and using coated substrates, wherein the coated substrate comprises a coating consisting essentially of a layered mineral, a thermoplastic polymeric substrate having pendant groups receptive to said layered mineral, and wherein said pendant groups are coordinated metal groups, or are groups which can be bonded to coordinating cations or anions, or pendant groups directly receptive said layered mineral. The coated substrate is less permeable to gases, such as oxygen and carbon dioxide.

19 Claims, 12 Drawing Sheets

CLAY COATINGS FOR THERMOPLASTIC POLYMERIC RESINS OR FILMS

This Application claims the benefit of U.S. Provisional Application 60/172,957, filed Dec. 21, 1999.

FIELD OF THE INVENTION

The present invention relates to coated thermoplastic polymer compositions and methods of making and using such compositions. The coating comprises at least one mineral, and clays in particular. The coating renders the thermoplastic polymer less permeable to gases, such as oxygen and carbon dioxide.

TECHNICAL BACKGROUND

Thermoplastic polymer and related resins are often used as materials for food and beverage containers, particularly for carbonated beverages such as soda and beer. The advantages to using "plastic" bottles are numerous, and include lighter weight, lower cost, recyclability and increased safety to the consumer. However, there are some disadvantages, including their inherent permeability to gases. Because thermoplastic polymer materials, such as poly(ethylene terephthalate) (PET), are permeable with respect to gases such as oxygen and carbon dioxide, the contained beverages have a relatively short shelf-life, i.e., either go "flat" as carbon dioxide permeates out or "spoil" as oxygen permeates into the beverage.

Decreasing the permeability of the container material is desired, and several options have been explored. These include coating the outside of the containers with a solid film of less-permeable material, which can provide added expense and weight, and which can fail if the film lacks adhesion to the container. Another way has been to provide a coating to the inside of the container, but this coating must be approved by the FDA as permissible for food contact. Still another way has been to include a component within the resin itself (e.g., an exfoliated clay or mineral) to improve the permeation resistance, but often the ease of polymer processing and the mechanical properties are sacrificed. Since the clay is dispersed within the resin, a higher loading of clay is required to achieve the same permeation resistance than if the clay were concentrated along an interface.

EP 0 778 153 A1 discloses a laminated film comprising a base film and a layer which contains an inorganic layered compound and a resin. The film is produced by gravure coating. Examples of resins for the base film are polyolefin resins, polyester resins, amide resins, acrylic resin, hydrophobicized cellulose resins, hydrogen-bondable resins, and engineering plastics. Since the layered compounds are dispersed within the resin, the layered compounds are not bound directly to the base film, and a higher loading of clay is required to achieve the same permeation resistance than if the clay were concentrated along an interface of the film base. Furthermore, the resin component of the coating adds to the total cost of the fabricated item.

SUMMARY OF THE INVENTION

The present invention relates to a composition comprising a thermoplastic polymeric substrate, and a coating consisting essentially of a layered mineral.

The present invention also relates to a method of making a composition comprising a thermoplastic polymeric substrate and a coating consisting essentially of a layered mineral, comprising the step of contacting a substrate comprising a thermoplastic polymer having pendant groups receptive to a layered mineral with a solution consisting essentially of a layered mineral and a dispersant.

The present invention further relates to a method of reducing the gas permeability of a thermoplastic polymeric substrate comprising applying a coating consisting essentially of a layered mineral to a thermoplastic polymeric substrate having at least one surface functionalized with pendant groups receptive to the layered mineral.

The present invention also relates to a method for packaging a liquid in a molded biaxially oriented polymeric container comprising the steps of forming a container; applying a coating consisting essentially of a layered mineral to at least one surface of said container; introducing a liquid into the container; and sealing the container.

Figure 1:
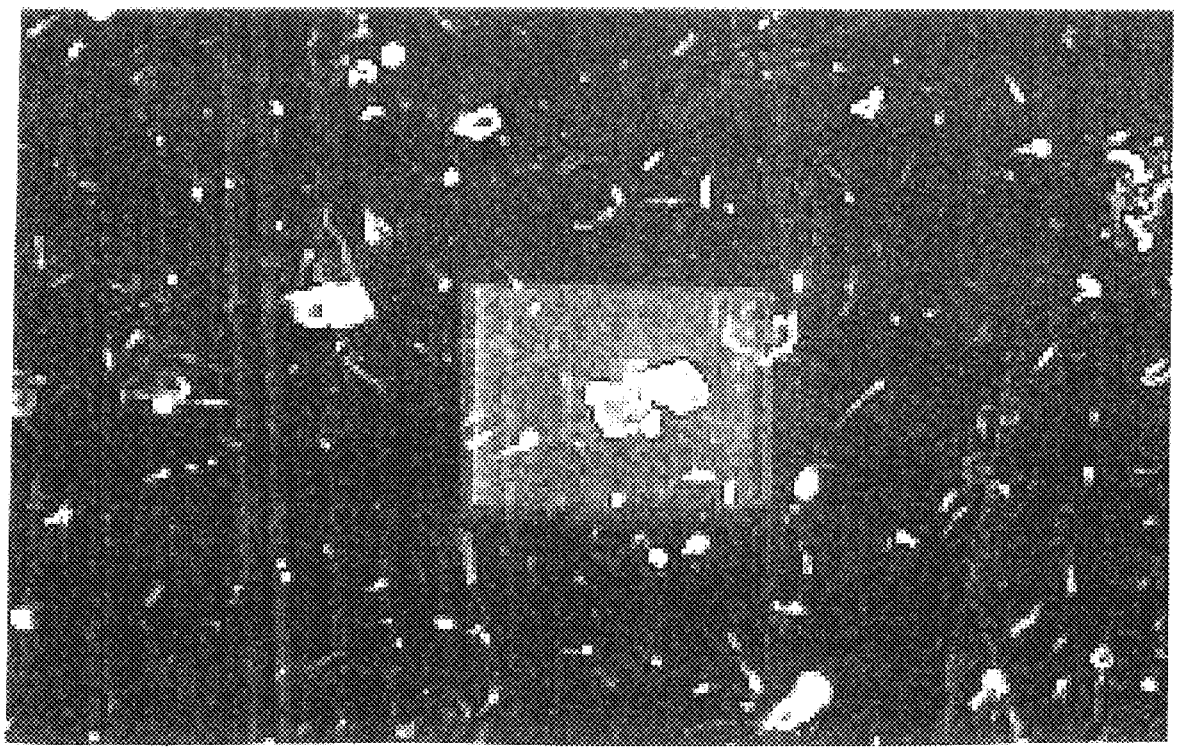
FIG. 1 is an electronic image from a scanning electron microscope of the composition of Example 1 using a scale of 1 micron.
Figure 2:
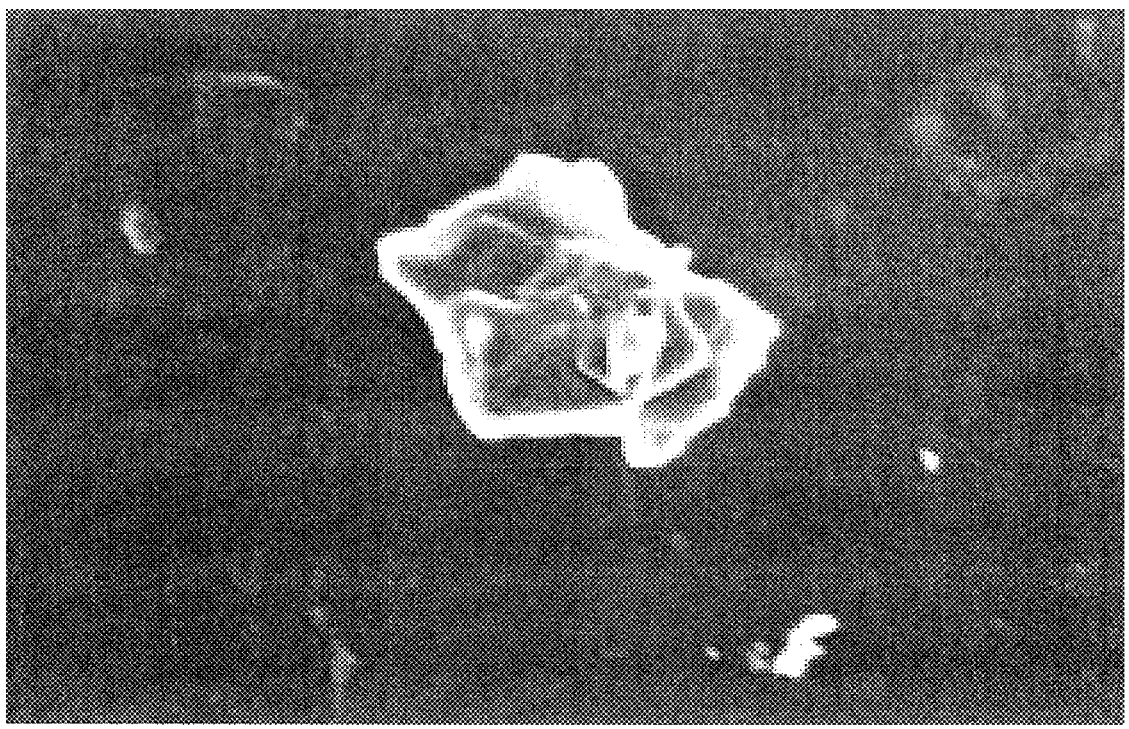
FIG. 2 is an electronic image from a scanning electron microscope of the composition of Example 1 using a scale of 3.0 microns.
Figure 3:
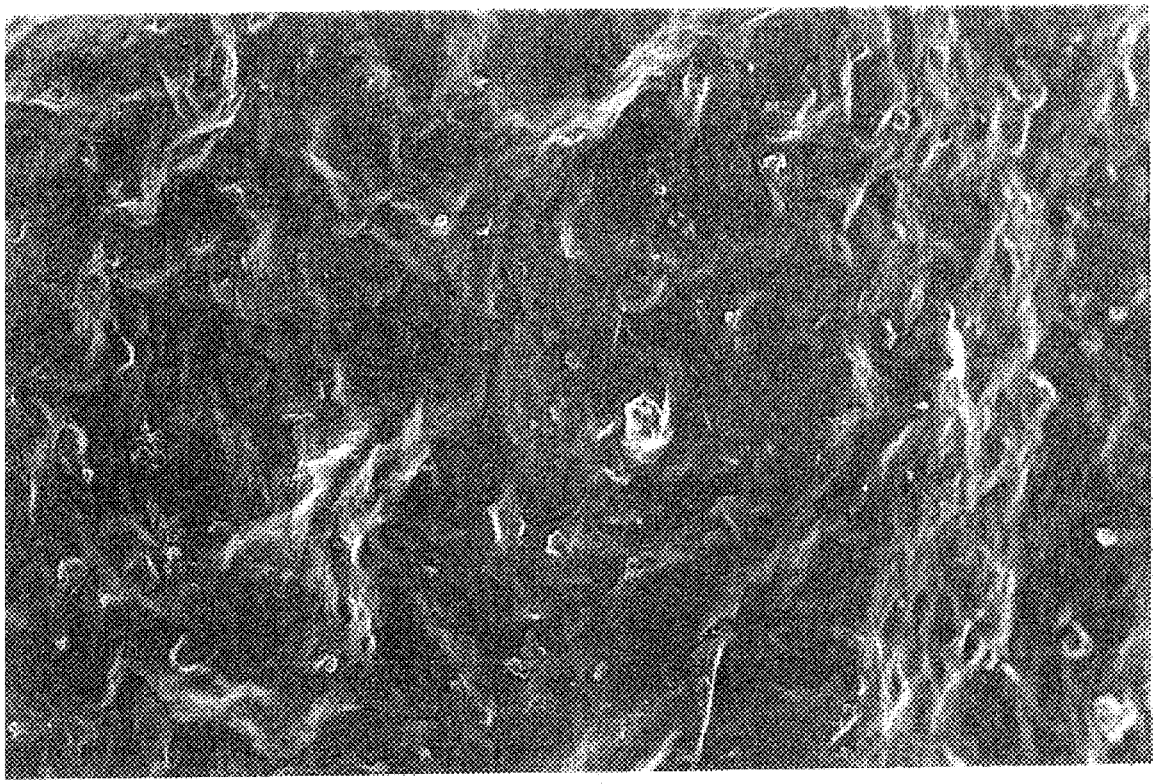
FIG. 3 is an electronic image from a scanning electron microscope of the composition of Example 5 using a scale of 3.0 microns.
Figure 4:
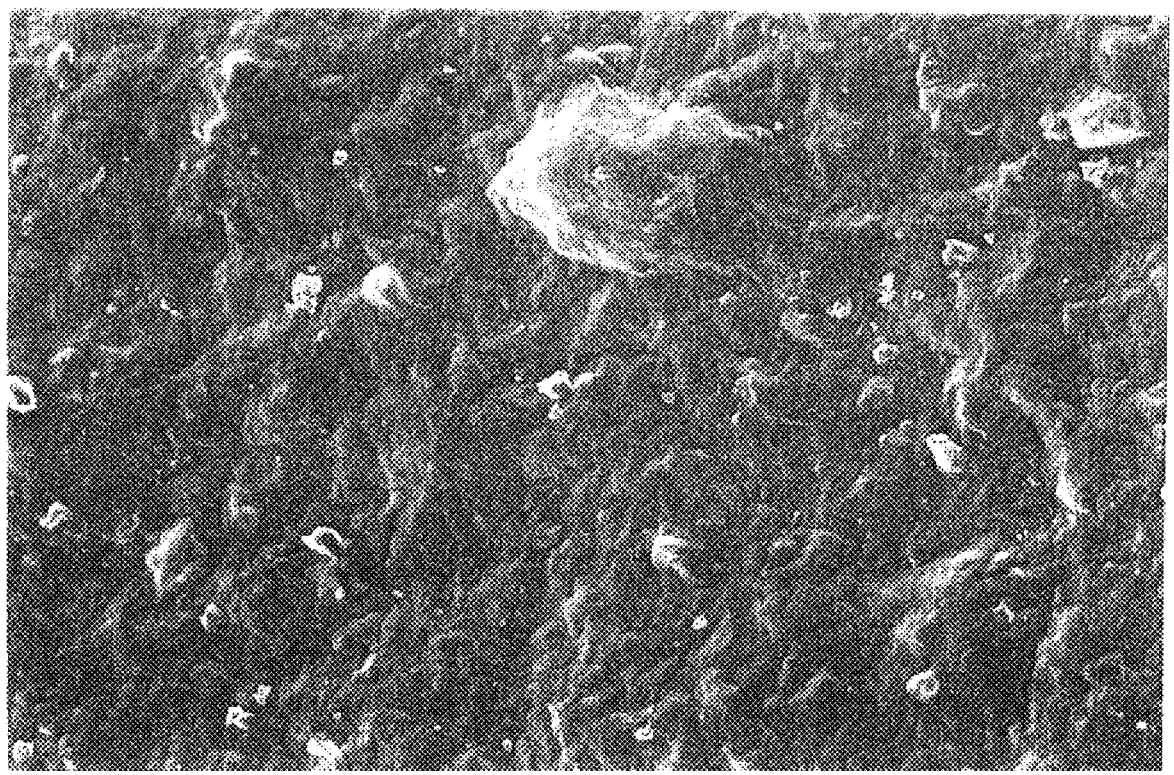
FIG. 4 is an electronic image from a scanning electron microscope of the composition of Example 6 using a scale of 6.0 microns.
Figure 5:
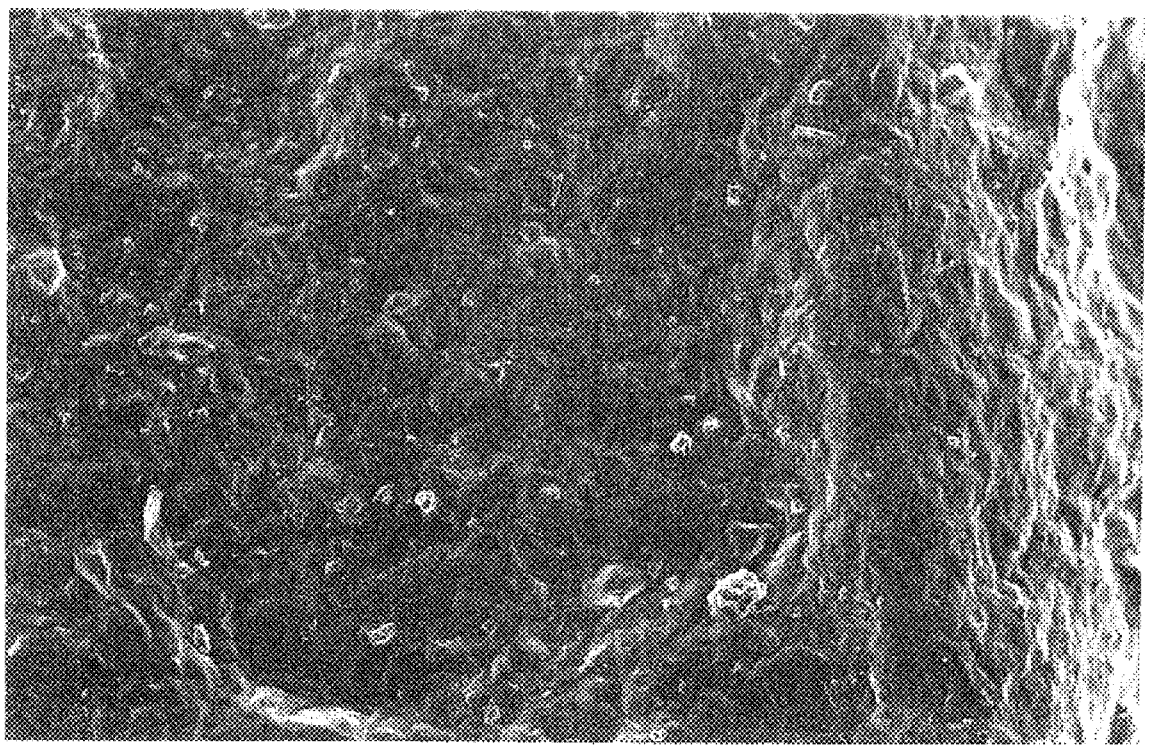
FIG. 5 is an electronic image from a scanning electron microscope of the composition of Example 7 using a scale of 3.0 microns.
Figure 6:
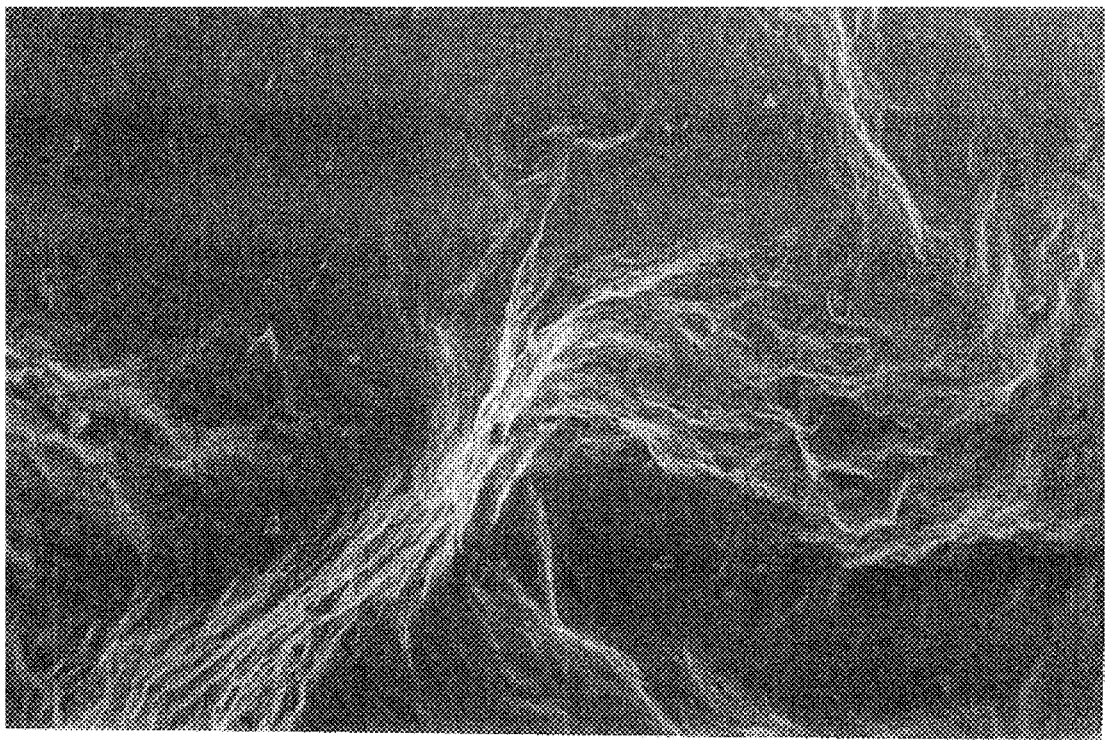
FIG. 6 is an electronic image from a scanning electron microscope of the composition of Example 8 using a scale of 3.0 microns.
Figure 7:
FIG. 7 is an electronic image from a scanning electron microscope of the composition of Example 9 using a scale of 3.0 microns.
Figure 8:
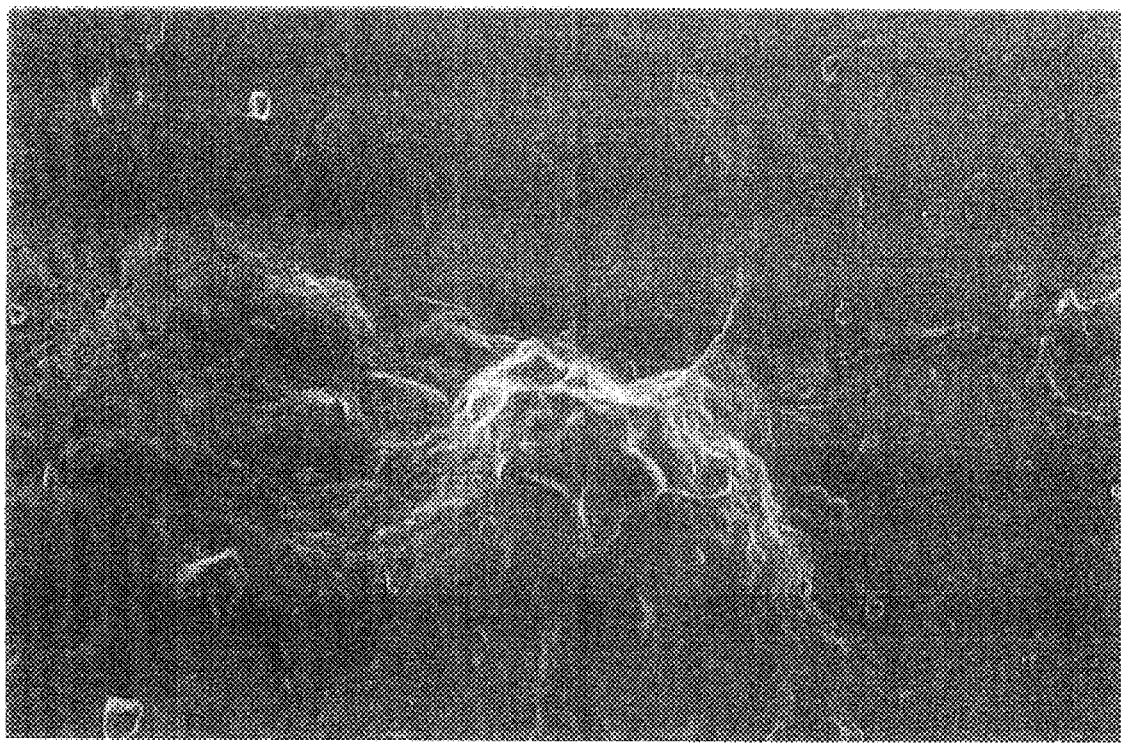
FIG. 8 is an electronic image from a scanning electron microscope of the composition of Example 10 using a scale of 3.0 microns.
Figure 9:
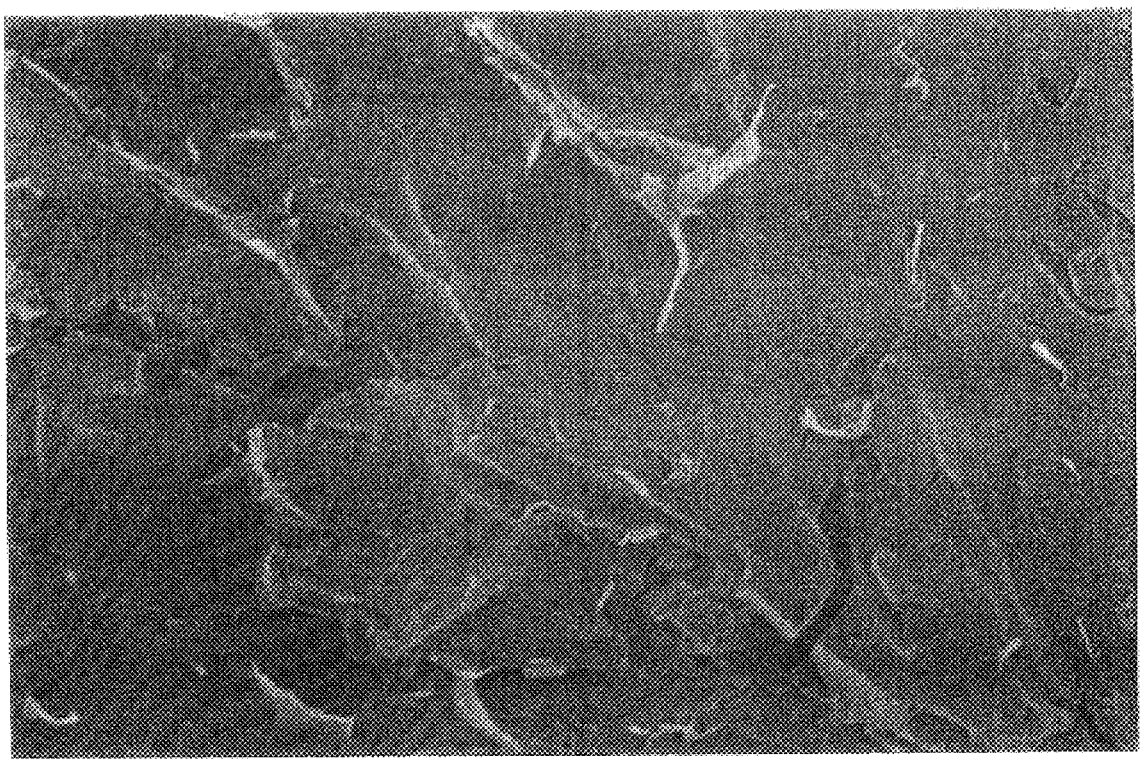
FIG. 9 is an electronic image from a scanning electron microscope of the composition of Example 11 using a scale of 1.0 microns.
Figure 10:
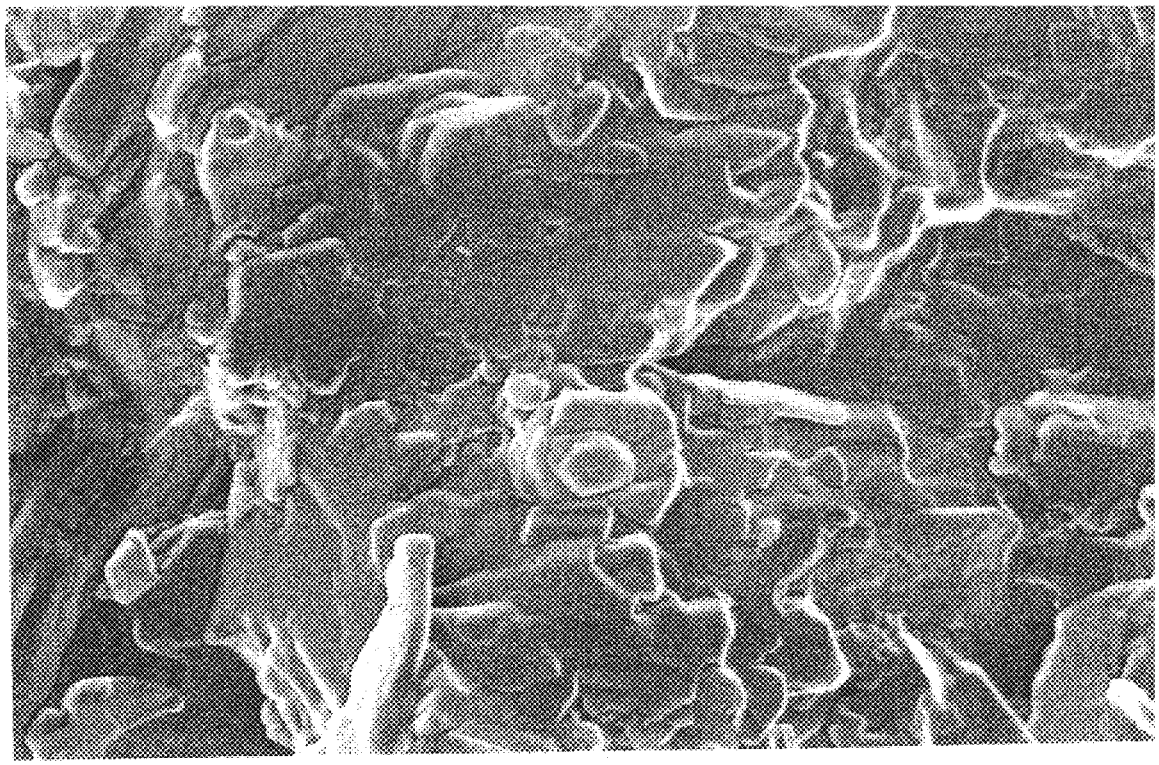
FIG. 10 is an electronic image from a scanning electron microscope of the composition of Example 12 using a scale of 0.5 microns.
Figure 11:
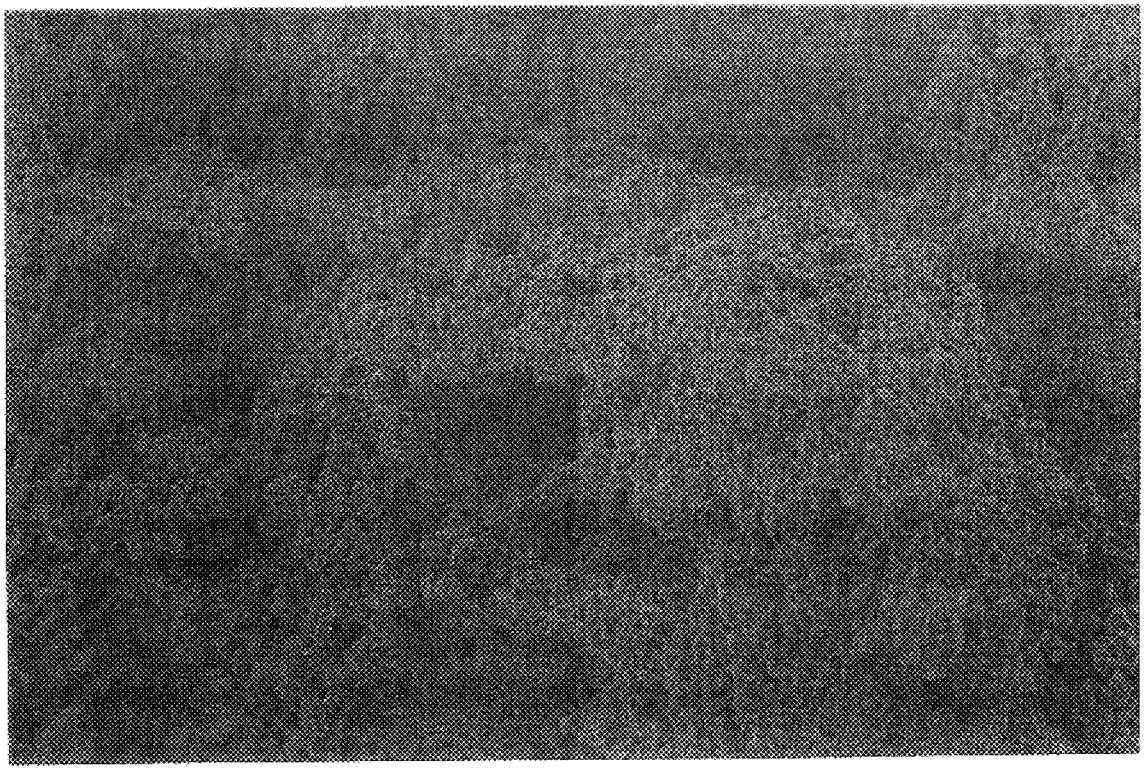
FIG. 11 is an electronic image from a scanning electron microscope of the composition of Example 13 using a scale of 3.0 microns.
Figure 12:
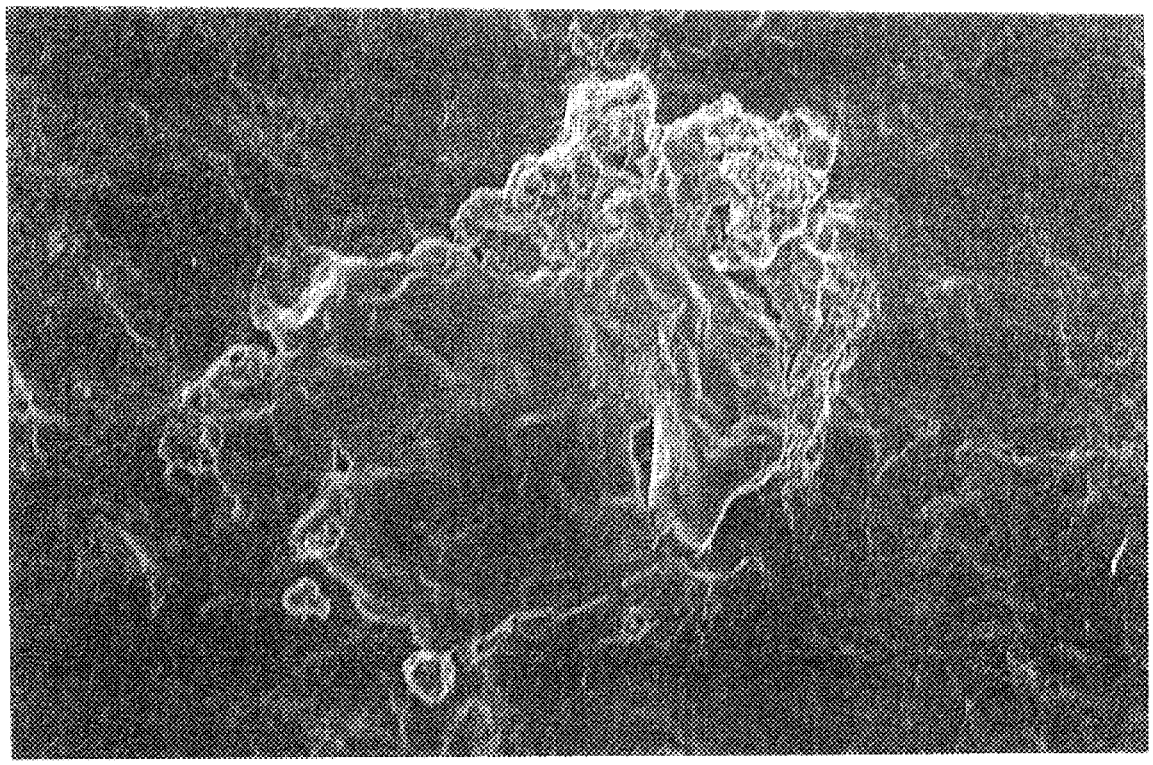
FIG. 12 is an electronic image from a scanning electron microscope of the composition of Example 14 using a scale of 3.0 microns.

For FIGS. 1–2, clay particulates are contrasted white features over a smooth, black polymer surface. For FIGS. 3–12 the clay particulates form a continuous coating over the polymer substrates and contrasted features illustrate the clay coating surface.

DETAILS OF THE INVENTION

The present invention relates to a coating and a method whereby the gas permeability of thermoplastic polymeric containers can be selectively reduced by the application of a layered mineral which adheres to the surface of the thermoplastic polymer. More specifically, coatings made of impermeable clay particulates can be applied to a desired surface area coverage, depending on the barrier requirement for the specific application. Thus, in order to increase or decrease the permeability of the thermoplastic polymeric container, more or less of the active surface can be coated.

The present invention thus concerns a composition prepared from a substrate comprising a thermoplastic polymer which possesses or has been functionalized to possess pendant groups, which can include reactive chain ends and/or pendant groups along the middle of the thermoplastic polymer, that are receptive to a layered mineral. Such pendant groups are preferably metal coordinated groups or are groups which can be bonded to coordinating cations or anions. To this functionalized substrate is applied a coating which consists essentially of a layered mineral. The coating adheres to at least a portion of at least one surface of the thermoplastic polymeric substrate through the pendant groups receptive to the layered mineral. The coating, which consists essentially of layered mineral in the form of particulates, is preferably a continuous coating of such particulates. The coating which can include such as silicateous clays and the like, can be physically or chemically bound to the surface of the substrate at the pendant groups receptive to layered minerals which pendant groups can be chemical bonding sites, such as can be provided by groups including metal coordinated groups and groups which can be bonded to coordinating cations or anions.

The thermoplastic polymeric substrate used in the present invention can be prepared from thermoplastic polymeric materials. Such thermoplastic polymeric materials include conventional thermoplastic polymers, copolymers, or blends of such polymers and copolymers (collectively referred to herein as "thermoplastic polymers"), such as polyesters, polyolefins, polyamides, and engineering polymers, such as polycarbonates, and blends of the foregoing. The invention is applicable to films and rigid, i.e., shaped, containers, and injection stretch blow molded biaxially oriented hollow thermoplastic containers, such as bottles, formed from synthetic linear polyesters, such as polyethylene terephthalate (PET), polybutylene terephthalate (PBT), polyethylene naphthalate (PEN), and the like, including homopolymers and copolymers of ethylene terephthalate and ethylene naphthalate wherein up to about 50 mole percent or more of the copolymer can be prepared from the monomer units of ethylene glycol, diethylene glycol; propane-1,3-diol; butane-1,4-diol; polytetramethylene glycol; polyethylene glycol; polypropylene glycol; isosorbide and 1,4-hydroxymethylcyclohexane substituted for the glycol moiety in the preparation of the copolymer; or isophthalic, terephthalic, dibenzoic; naphthalene 1,4- or 2,6-dicarboxylic; adipic; sebacic; and decane-1,10-dicarboxylic acid substituted for the acid moiety in the preparation of the copolymer. The foregoing description is intended to be an illustration of applicable thermoplastic polymeric substrates and not by way of a limitation on the scope of the invention.

Preferably, a polyester resin or film is used to prepare the substrate of the present invention. The polyester film or resin of the present invention can be selected from the group consisting of poly(alkylene arylate)s, poly(arylene alkylate)s, and poly(alkylene alkylate)s. More preferred are poly(ethylene terephthalate) (PET), poly(trimethylene terephthalate) (PTT), and poly(butylene terephthalate) (PBT). Beverage containers are generally made from PET, and therefore PET is most preferred because of its low cost, processability and availability.

Certain thermoplastic polymers possess pendant groups which are directly receptive to a layered mineral without further processing. Such thermoplastic polymers possess pendant groups including carboxylic acids, alcohols, amines, amides, esters, halides, aldehydes, epoxides, thiols, thioamides, mercaptans, nitro, nitroso, carbonate, nitriles, azides, cyanates, sulfoxides, sulfites, sulfates, sulfonic acids, sulfoamides, sulfonate esters, sulfones, phosphites, phosphonates, phosphoramides, phosphates, oximes and silicates. Other thermoplastic polymers can be prepared with appropriate comonomers to provide such pendant groups which can be receptive to a layered mineral. For example, a thermoplastic polymer based on a sulfonyl isophthalate derivative can be functionalized to introduce multiple cationic sites which can be receptive to a layered mineral. This functionalization can involve a conversion of the sulfonyl group to a reactive sulfonyl chloride group which can then be reacted with an amine to provide multiple amino sites. These amino sites can then be protonated to introduce multiple cationic sites per each sulfonyl group for binding to the layered mineral, such as montmorillonite clay.

Since certain thermoplastic polymers, for example PET and other poly(alkylene arylates), are initially wholly or largely deficient of pendant groups receptive to a layered mineral, such thermoplastic polymers can be functionalized to provide chemical sites or additional chemical sites, such as metal coordinated groups or groups which can be bonded to coordinating cations or anions, to which a layered mineral, such as a clay, can directly bond. Metal cations can provide bonds between reactive pendant groups of the thermoplastic polymer of the substrate and certain layered minerals. Such metal cations have a positive charge while the pendant groups of layered minerals, such montmorillonite clay have a negative charge. Other pendant groups carrying a slight positive charge, for example amines, can also be used to attract negatively charged clay particles. Other layered minerals including hydrotalcite have positive charges. In these cases the pendant groups of the thermoplastic polymer preferably possess slight negative charges to attract and bond to the positively charged clays.

One method of so functionalizing these thermoplastic polymers is by depolymerizing the thermoplastic polymer at the surface of the substrate to leave a functional group at the end of the broken chains. For example, PET and other poly(alkylene arylates) can be exposed to a chemical agent, such as an acid, a base or a reducing agent, including lithium aluminum hydride, sodium hydroxide and sodium borohydride. Such chemical agents will generally increase the concentration of hydroxy and/or carboxylic acid pendant groups near the polymer surface. Other chemical agents such as triethyl aluminum and other alkyl metals react with Bronsted acid groups to form a carboxylic acid salt of the metal. Such agents would also react with hydroxy groups to form a bond with the metal.

Another method for functionalizing the thermoplastic polymer is by incorporating an appropriate comonomer into the thermoplastic polymer, such as a poly(alkylene arylate) resin, either by copolymerizing the comonomer with the monomers that form the poly(alkylene arylate) or by adding the comonomer to the poly(alkylene arylate) during extrusion of the polyester film or resin. Suitable comonomers include those possessing either an acid group and an alcohol group, or two acid groups, or two alcohol groups, or are salts thereof that could be converted to their acid form. Such pendant groups would be reactive with a metal. In addition to acid and alcohol groups, suitable pendant groups for comonomers which provide metal-reactive pendant groups include a sulfonyl group, an oxysulfur group, an oxyphosphorous group, an amine group, or an aldehyde group.

Representative examples of comonomers useful herein include lithium sulfonyl isophthalate, benzene tricarboxylic acid, hydroxy terephthalate, and hydroxy isophthalate. A preferred comonomer is lithium sulfonyl isophthalate (LiSI).

In one embodiment of the present invention, the monomers used to prepare a poly(alkylene arylate) can be copolymerized with lithium sulfonyl isophthalic acid salt. Following polymerization, the pendant salt groups of the LiSI component of the resulting polymer can easily be converted to their Bronsted acid form by contact with a strong acid, thereby providing sulfonic acid pendant groups. Suitable strong acids include HCl and $H_2SO_4$. After contact with the acid, the surface of the substrate can be optionally rinsed with water or other suitable dispersant. After rinsing the surface of the substrate, the substrate can be optionally dried by either wiping or evaporation. The pendant acid groups thus provided are metal-reactive and can be converted to pendant coordinated metal groups as detailed below. Such pendant coordinated metal groups are receptive to a layered mineral.

Since certain pendant groups of a thermoplastic polymer or a thermoplastic polymer incorporated with a comonomer having pendant groups may not be strongly receptive to a layered mineral, contacting a substrate, having for example LiSI pendant groups, with a chemical agent, such as an alkyl metal or a metal alkoxide, may be desirable in order to form coordinated metal groups. Treatment of the surface of the thermoplastic polymeric substrate having a metal-reactive groups with an alkyl metal or a metal alkoxide to form coordinated metal groups can increase the ability of a layered mineral to adhere to the substrate as such coordinated metal groups are receptive to a layered mineral. Thus, the present method can further include contacting the surface of a substrate which comprises metal-reactive pendant groups with a solution comprising an alkyl metal or a metal alkoxide for a time sufficient to convert any metal-reactive pendant groups, such as Bronsted acid ends, of the thermoplastic polymer or of any comonomer component present, to coordinated metal groups. By "coordinated metal group" is meant that a pendant group of the polymer is bonded to an oxygen which is in turn bonded to a multivalent metal which may have other ligands. The cations of such alkyl metals or metal alkoxides are preferably selected from the group consisting of Zr, Zn, Fe, Mn, Sn, Ca, Mg, Al, Si, and Ti. Suitable alkyl metals or metal alkoxides include diethyl zinc, zirconium propoxide, aluminum propoxide, calcium ethoxide, iron (II) propoxide, magnesium ethoxide, manganese propoxide, tin(IV) propoxide, and titanium (IV) propoxide.

The alkyl metals or metal alkoxides can be used in a solution. Suitable solvents for alkyl metals include diethyl ether or tetrahydrofiran. Suitable solvents for metal alkoxides include alcohols such as propanol, ethanol and methanol. The alkyl metal or metal alkoxide in the solution can be of any convenient concentration. The conversion of the metal-reactive group to the coordinated metal group can require a few seconds to several minutes.

After contact with the alkyl metal or metal alkoxide solution, the surface of the substrate can be optionally rinsed with an alcohol or other suitable solvent.

Alternatively, for thermoplastic polymers or thermoplastic polymers incorporated with a comonomer having pendant groups that are not strongly receptive to a layered mineral contact with a solution comprising an amine can provide pendant groups that can be bonded to coordinating anions on a layered mineral, such as montmorillonite clay.

For example, a thermoplastic polymer having LiSI pendant groups, following removal of the lithium from the sulfonyl group, can be contacted with a solution comprising an amine. Representative examples of such amines include tris(2-aminoethyl) amine and pentaethylenehexamine. A representative solvent is pyridine.

After a suitable pendant group receptive to a layered mineral resides on at least one surface of the substrate, the surface of the substrate can be contacted with a colloidal solution or colloidal suspension consisting essentially of a layered mineral and a dispersant. Any layered mineral can be used in the composition or method of the present invention, and there is no need for the layered mineral to be exfoliated or exfoliatable; however, a layered mineral exfoliated in a liquid dispersant is preferred. The layered mineral can be a phyllosilicate, a layered silicate, or an inorganic layered compound. Suitable examples of such layered minerals are clays including hydrotalcite, kaolinite, serpentine, pyrophyllite, smectite, montmorillonite, vermiculite, illite, mica, chlorite, and saponite. Such layered minerals are available commercially and comprise platelets which can have a thickness of from 10 to 60 Angstroms and an aspect ratio, i.e., the ratio of the maximum width of a platelet to its thickness, of typically greater than 150. Additional information on layered minerals can be found in "The Chemistry of Clay Minerals", by Charles E. Weaver and Lin D. Pollard, *Developments in Sedimentology* 15, 1973 and in "Clay Mineralogy" by Ralph E. Grim, 1968. More detailed information on the composition and structure of phyllosilicate layer minerals can be found in "Clay Minerals: Their Structure, Behaviour & Use", Proceedings of a Royal Society Discussion Meeting, 9 & 10 November 1983, London, the Royal Society, 1984.

The layered mineral can be combined with a suspending or dispersing phase, such as water, alcohol or an organic solvent, to give the appropriate concentration for the desired result. For example, a concentration of about 3%, or less than about 10%, by weight of clay in water can be useful. The amount of layered mineral deposited on the surface of the substrate can be controlled by the length of time the surface of the substrate is contacted with the layered mineral and/or by the number of pendant groups receptive to a layered mineral residing on the surface of the substrate, such as chemical binding sites available on at least one surface of the substrate.

Alternatively, the amount of layered mineral deposited can be controlled by a treatment applied to the substrate surface before the substrate surface is contacted with the layered mineral. Examples of treatment include, but are not limited to, exposing the surface of the substrate to electrical discharge, flame, plasma, reducing agents, oxidizing agents, metal atoms, metal coordination compounds, silicateous compounds, or other precoatings.

The layered mineral coating can be applied to the at least one surface of the substrate by dipping, spray coating, or casting. After contact with the layered mineral solution, the substrate surface can be rinsed with water and dried by either evaporation or wiping.

The layered mineral coating can also be applied to objects including manufactured articles prepared from the thermoplastic polymeric substrates such as films, containers, bottles and the like, as well as other objects such as preforms, oligomer pastilles and polymer resins to further functionalize such substrates for other applications.

The composition of the present invention may further comprise one or more additional coatings. The layered mineral of a first coating can be treated to accept one or more additional coatings. Suitable treatments include exposure of the first coating to solutions comprising cations and anions, such as salts, or other reactive compounds to form a chemical bridge between coatings thus assisting in intercoating bonding. A second coating can be used for protecting the first coating to increase the effectiveness of the first coating. The same second coating or an additional coating can be used to provide printing on the composition, label the composition or further process the composition. An additional coating can comprise a metal oxide, a mixture of metal oxides, one or more polymer resins, or a combination of any of the foregoing. For example, liquid tetraethyl orthosilicate (TEOS) containing dilute HCl in water can be used to form an additional coating comprising silica by widely known means of gelation and drying. The liquid TEOS can further contain zirconium(IV) propoxide to provide an additional coating layer of zircon-silica.

The present invention offers advantages over currently-used technology. First, problems with direct food contact are obviated since it is possible to apply the layered mineral coating to only one side of a substrate or to a portion thereof or to an outside surface of a manufactured container or part or a portion thereof. Secondly, because the layered mineral coating is applied to the thermoplastic polymeric substrate or container made therefrom after manufacture, the polymer processing advantages of using a thermoplastic polymer with no layered mineral incorporated therein are maintained as well as the mechanical properties of the thermoplastic polymer used. Additionally, inexpensive natural clays can be efficiently used as the layered mineral as they reside only on the surface of the substrate or article in a desired amount thus providing targeted permeation resistance. In addition, with the use of natural clays possible, they can be used "as is", without need to be exfoliated or exfoliatable. Furthermore, process cost is not increased from use of an additional resin in the coating containing the layered mineral since the layered material in the present process is directly bonded to the surface of the substrate.

The present invention is useful for packaging beverages. Thus the present invention further concerns a method for packaging a liquid in a molded biaxially oriented polymeric container comprising forming a container; applying a coating consisting essentially of a layered mineral to at least one surface of said container; introducing a liquid into the container; and sealing the container. This method can further comprise purging the gas from the container prior to introduction of the liquid. This method can be suitable for carbonated liquids.

The present invention is suited for improving the gas barrier performance of poly(ethylene terephthalate) films and rigid containers used for packaging foods and beverages, and injection stretch blow molded PET bottles used for packaging carbonated soft drinks and beer. Thus, the present invention includes a method for reducing the gas permeability of a thermoplastic polymeric substrate comprising applying a coating consistently essentially of a layered mineral to a thermoplastic polymeric substrate having at least one surface functionalized with pendant groups receptive to a layered mineral, as described herein.

Oxygen permeability can be determined by cutting a 10×10 cm square sample from the side wall of a coated PET bottle and measuring oxygen transmission through the specimen using a Mocon, Oxtran 10/50 s/n 1187145 at 30° C. and 90% relative humidity. The sample is placed in the Mocon test cell with nitrogen carrier gas flowing above and below the sample, and it is left to equilibrate over night in order to flush dissolved oxygen from the sample and obtain a background reading. The nitrogen above the sample is then replaced with oxygen and left to equilibrate overnight, and then the amount of oxygen which had permeated through the sample is measured using a sensor. The average thickness of the sample is measured using a micrometer, and this measurement is used to calculate the oxygen permeability for standard units of cc mil/100 in2/day/atm. Control measurements can be carried out on uncoated bottles in the same way. Typical wall thickness for commercially produced PET bottles for carbonated beverages and soft drinks are between 200–350 microns.

EXAMPLES

Example 1

Binding of Sodium Montmorillonite Clay to Zirconated P(ET-co-LiSI)

A copolymer, P(ET-co-LiSI), of bis(2-hydroxyethyl terephthalate) (BHET) and dimethyl sulfonyl isophthalate lithium salt (LiSI) was prepared by widely known means of condensation polymerization to form a copolymer containing about 5 mole percent LiSI. The copolymer was melted, extruded into a film and cut into narrow strips. These strips were sequentially: dipped in concentrated HCl, rinsed with water and dried, dipped in a zirconium(IV) propoxide 70 wt % solution in propanol, rinsed with propanol, dipped into a sodium montmorillonite 3.5 wt % colloidal solution in water neutralized to pH=7 with HCl, rinsed with water and dried with a paper wipe. The procedure was repeated using water/clay solutions adjusted with concentrated HCl to span a pH response between 3 and 7. As shown in the SEM electronic images of FIGS. 1 and 2, montmorillonite clay bonded to the P(ET-co-LiSI) surface.

The clay coating renders the coated polymer product less permeable to oxygen and carbon dioxide.

Example 2

Binding of Sodium Montmorillonite Clay to Reduced and Zirconated PET

PET was prepared from bis(2-hydroxyethyl terephthalate) (BHET) by widely known means of condensation polymerization to form a polymer with a weight average molecular weight of 44,000. The polymer was melted, extruded into a film and cut into narrow strips. These strips were sequentially: dipped in lithium aluminum hydride, 5 wt % solution in diethyl ether, rinsed with diethyl ether and dried, dipped in a zirconium(IV) propoxide 70 wt % solution in propanol, rinsed with propanol, dipped into a sodium montmorillonite 3.5 wt % colloidal solution in water neutralized to pH=7 with HCl, rinsed with water and dried with a paper wipe. The procedure was repeated using water/clay solutions adjusted with concentrated HCl to span a pH response between 3 and 7. Some montmorillonite clay bonded to the PET surfaces.

The clay coating renders the coated polymer product less permeable to oxygen and carbon dioxide.

Example 3

Binding and Coating of Sodium Montmorillonite Clay to Zirconated PET

The clay coated polymer from Example 1 is additionally coated with liquid tetraethyl orthosilicate (TEOS) containing dilute HCl in water. The liquid is permitted to form a silica coating by widely known means of gelation and drying. The PET is now coated with clay and silica. The procedure is repeated using clay coated polymer from Example 2.

Example 4

Binding and Coating of Sodium Montmorillonite Clay to Zirconated PET

The procedure of Example 3 is repeated except the liquid TEOS also contains zirconium(IV) propoxide. The PET is now coated with clay and a zircon-silica overcoat.

Examples 5–12

Binding of Sodium Montmorillonite Clay to Cationated PET

PET was prepared from bis(2-hydroxyethyl terephthalate) (BHET) by widely known means of condensation polymerization to form a polymer with a weight average molecular weight of 44,000. The polymer was melted, extruded into a film of nominal thickness (2 mils) and cut into convenient strips. The strips were soaked in 25 wt % sodium hydroxide in water for about 2 hours. The strips were rinsed with water and dried in a convection oven at 80° C. One strip was soaked in one metal alkoxide listed in Table 1 for 2 hours. The strip was then transferred to a colloidal solution containing sodium-exchanged montmorillonite clay at a concentration of about 3 wt % in water brought to pH=6 using hydrochloric acid. The strip was removed from the clay solution and dried in a convection oven at 80° C. The clay-coated strip was rinsed and washed thoroughly in hot water to remove unbound clay. The clay coatings remained adhered to the polymer strips. The clay coating was observed by scanning electron microscopy for completeness of coating and porosity (see FIGS. 3–10).

The clay coating renders the coated polymer product less permeable to oxygen and carbon dioxide.

TABLE 1

| Example Number | Alkoxide | Concentration | Example FIG. |
|---|---|---|---|
| 5 | Aluminum propoxide | 0.5 g/mL in propanol | 3 |
| 6 | Calcium ethoxide | 0.025 g/mL in ethanol | 4 |
| 7 | Iron(III) propoxide | 0.05 g/mL in propanol | 5 |
| 8 | Magnesium ethoxide | 1.0 mg/mL in ethanol | 6 |
| 9 | Manganese propoxide | 0.05 g/mL in propanol | 7 |
| 10 | Tin(IV) propoxide | 0.1 g/mL in propanol | 8 |
| 11 | Titanium(IV) propoxide | 0.442 g/mL in propanol | 9 |
| 12 | Zirconium propoxide | 0.731 g/mL in propanol | 10 |

Example 13

Binding of Hydrotalcite Clay to Cationated PET

PET was prepared from bis(2-hydroxyethyl terephthalate) (BHET) by widely known means of condensation polymerization to form a polymer with a weight average molecular weight of 44,000. The polymer was melted, extruded into a film of nominal thickness (2 mils) and cut into convenient strips. The strips under nitrogen atmosphere were dipped quickly in lithium aluminum hydride 1.0 molar solution in diethyl ether for 30 seconds then transferred immediately into a colloidal suspension of about 5 wt % hydrotalcite mineral in dimethyl sulfoxide brought to pH=3 by hydrochloric acid. The sample was dried by wiping. A thin layer of hydrotalcite clay remained bound to the PET. The mineral coating was observed by scanning electron microscopy for completeness of coating and porosity (see FIG. 11).

The clay coating renders the coated polymer product less permeable to oxygen and carbon dioxide.

Example 14

Binding of Hydrotalcite Clay to Cationated PET

PET was prepared from bis(2-hydroxyethyl terephthalate) (BHET) by widely known means of condensation polymerization to form a polymer with a weight average molecular weight of 44,000. The polymer was melted, extruded into a film of nominal thickness (2 mils) and cut into convenient strips. The strips under nitrogen atmosphere were dipped quickly in triethyl aluminum 93% for 30 seconds then transferred immediately into a colloidal suspension of about 5 wt % hydrotalcite mineral in dimethyl sulfoxide brought to pH=3 by hydrochloric acid. The sample was dried by wiping. A thin layer of hydrotalcite clay remained bound to the PET. The mineral coating was observed by scanning electron microscopy for completeness of coating and porosity (see FIG. 12).

The clay coating renders the coated polymer product less permeable to oxygen and carbon dioxide.

Example 15

Binding of Sodium Montmorillonite Clay to P(ET-co-LiSI) by an Amine

A copolymer, P(ET-co-LiSI), of bis(2-hydroxyethyl terephthalate) (BHET) and dimethyl sulfonyl isophthalate lithium salt (LiSI) is prepared by widely known means of condensation polymerization to form a copolymer containing about 5 mole percent LiSI. The copolymer is melted, extruded into a film and cut into narrow strips. The strip is then soaked for around six hours in dichloromethane containing at least 3 equivalents of triphenylphosphine and sulfuryl chloride based on the lithium atom concentration. The sample is optionally rinsed with dichloromethane. The sample is then transferred into a pyridine solution containing at least 3 equivalents of tris(2-aminoethyl) amine for about three hours. The strip is optionally rinsed with fresh pyridine. The strip is then transferred to a colloidal solution containing sodium-exchanged montmorillonite clay at a concentration of about 3 wt % in water brought to pH=6 using hydrochloric acid. The strip is removed from the clay solution and dried in a convection oven at 80° C. The clay-coated strip is rinsed and washed thoroughly in hot water to remove unbound clay. The clay coatings remain adhered to the polymer strips. The clay coating is observed by scanning electron microscopy for completeness of coating and porosity.

The clay coating renders the coated polymer product less permeable to oxygen and carbon dioxide.

Example 16

Binding of Sodium Montmorillonite Clay to P(ET-co-LiSI) by an Amine

A copolymer, P(ET-co-LiSI), of bis(2-hydroxyethyl terephthalate) (BHET) and dimethyl sulfonyl isophthalate lithium salt (LiSI) is prepared by widely known means of condensation polymerization to form a copolymer containing about 5 mole percent LiSI. The copolymer is melted, extruded into a film and cut into narrow strips. The strip is then soaked for around six hours in dichloromethane containing at least 3 equivalents of triphenylphosphine and sulfuryl chloride based on the lithium atom concentration. The strip is optionally rinsed with fresh dichloromethane. The sample is then transferred into a pyridine solution containing at least 3 equivalents of pentaethylenehexamine for about three hours. The strip is optionally rinsed with fresh pyridine. The strip is then transferred to a colloidal solution containing sodium-exchanged montmorillonite clay at a concentration of about 3 wt % in water brought to pH==6 using hydrochloric acid. The strip is removed from the clay solution and dried in a convection oven at 80° C. The clay-coated strip is rinsed and washed thoroughly in hot water to remove unbound clay. The clay coatings remain adhered to the polymer strips. The clay coating is observed by scanning electron microscopy for completeness of coating and porosity.

The clay coating renders the coated polymer product less permeable to oxygen and carbon dioxide.

Example 17

Binding of Sodium Montmorillonite Clay to P(ET-co-LiSI) by an Amine

A copolymer, P(ET-co-LiSI), of bis(2-hydroxyethyl terephthalate) (BHET) and dimethyl sulfonyl isophthalate lithium salt (LiSI) is prepared by widely known means of condensation polymerization to form a copolymer containing about 5 mole percent LiSI. The copolymer is melted, extruded into a film and cut into narrow strips. The strip is then soaked for around six hours in dimethyl formamide containing at least 3 equivalents of phosphorous pentachloride based on the lithium atom concentration. The strip is optionally rinsed with fresh dimethyl formamide. The sample is then transferred into a pyridine solution containing at least 3 equivalents of tris(2-aminoethyl) amine for about three hours. The strip is optionally rinsed with fresh pyridine. The strip is then transferred to a colloidal solution containing sodium-exchanged montmorillonite clay at a concentration of about 3 wt % in water brought to pH=6 using hydrochloric acid. The strip is removed from the clay solution and dried in a convection oven at 80° C. The clay-coated strip is rinsed and washed thoroughly in hot water to remove unbound clay. The clay coatings remain adhered to the polymer strips. The clay coating is observed by scanning electron microscopy for completeness of coating and porosity.

The clay coating renders the coated polymer product less permeable to oxygen and carbon dioxide.

Example 18

Binding of Sodium Montmorillonite Clay to P(ET-co-LiSI) by an Amine

A copolymer, P(ET-co-LiSI), of bis(2-hydroxyethyl terephthalate) (BHET) and dimethyl sulfonyl isophthalate lithium salt (LiSI) is prepared by widely known means of condensation polymerization to form a copolymer containing about 5 mole percent LiSI. The copolymer is melted, extruded into a film and cut into narrow strips. The strip is then soaked for around six hours in dimethyl formamide containing at least 3 equivalents of phosphorous pentachloride based on the lithium atom concentration. The strip is then optionally rinsed with fresh dimethyl formamide. The sample is then transferred into a pyridine solution containing at least 3 equivalents of pentaethylenehexamine for about three hours. The sample is optionally rinsed with fresh pyridine. The strip is then transferred to a colloidal solution containing sodium-exchanged montmorillonite clay at a concentration of about 3 wt % in water brought to pH=6 using hydrochloric acid. The strip is removed from the clay solution and dried in a convection oven at 80° C. The clay-coated strip is rinsed and washed thoroughly in hot water to remove unbound clay. The clay coatings remain adhered to the polymer strips. The clay coating is observed by scanning electron microscopy for completeness of coating and porosity.

The clay coating renders the coated polymer product less permeable to oxygen and carbon dioxide.

Comparison Example 1

Binding of Sodium Montmorillonite Clay to PET

PET was prepared from bis(2-hydroxyethyl terephthalate) (BHET) by widely known means of condensation polymerization to form a polymer with a weight average molecular weight of 44,000. The polymer was melted, extruded into a film of nominal thickness (2 mils) and cut into convenient strips. The polymer was cut into narrow strips. These strips were dipped into a sodium montmorillonite 3.5 wt % colloidal solution in water neutralized to pH=7 with HCl, rinsed with water and dried with a paper wipe. The procedure was repeated using water/clay solutions adjusted with concentrated HCl to span a pH response between 3 and 7. After drying the clay coatings did not adhere to the polymer strips.

Comparison Example 2

Binding of Sodium Montmorillonite Clay to P(ET-co-LiSI)

A copolymer, P(ET-co-LiSI), of bis(2-hydroxyethyl terephthalate) (BHET) and dimethyl sulfonyl isophthalate lithium salt (LiSI) was prepared by widely known means of condensation polymerization to form a copolymer containing about 5 mole percent LiSI. The copolymer was melted, extruded into a film and cut into narrow strips. These strips were dipped into a sodium montmorillonite 3.5 wt % colloidal solution in water neutralized to pH=7 with HCl, rinsed with water and dried with a paper wipe. The procedure was repeated using water/clay solutions adjusted with concentrated HCl to span a pH response between 3 and 7. After drying the clay coatings did not adhere to the polymer strips.

What is claimed is:

1. A coated substrate, comprising a thermoplastic polymeric substrate having pendant groups receptive to a layered mineral, and a coating consisting essentially of the layered mineral, wherein said pendant groups are coordinated metal groups or are groups which can be bonded to coordinating cations or anions or pendant groups which are directly receptive to the layered mineral.

2. The coated substrate of claim 1 wherein the thermoplastic polymer is polyester.

3. The coated substrate of claim 2 wherein the polyester is selected from the group consisting of poly(alkylene arylate)s, poly(arylene alkylate)s, and poly(alkylene alkylate)s.

4. The coated substrate of claim 3 wherein the polyester is selected from the group consisting of poly(ethylene terephthalate), poly(trimethylene terephthalate), and poly(butylene terephthalate).

5. The coated substrate of claim 1 wherein the layered mineral is a clay selected from the group consisting of a phyllosilicate, a layered silicate, and an inorganic layered compound.

6. The coated substrate of claim 5 wherein the clay is selected from the group consisting of hydrotalcite, kaolinite, serpentine, pyrophyllite, smectite, montmorillonite, vermiculite, illite, mica, chlorite, and saponite.

7. The coated substrate of claim 1 further comprising an additional coating comprising a metal oxide, a mixture of metal oxides, one or more polymer resins, or any combination of the foregoing.

8. The coated substrate of claim 1 wherein the metal coordinated group is selected from the group consisting of pendant groups derived from diethyl zinc, zirconium propoxide, aluminum propoxide, calcium ethoxide, iron(III) propoxide, magnesium ethoxide, manganese propoxide, tin (IV) propoxide, and titantium (IV) propoxide.

9. The coated substrate of claim 1 wherein the thermoplastic polymeric substrate is a copolymer of an alkylene arylate and a comonomer selected from the group consisting of lithium sulfonyl isophthalate, benzene tricarboxlic acid, hydroxy terephthalate, and hydroxy isophthalate.

10. The coated substrate of claim 9 wherein the thermoplastic polymeric substrate is a copolymer of ethylene terephthalate and lithium sulfonyl isophthalate.

11. A method for making a coated substrate comprising a thermoplastic polymeric substrate and a coating consisting essentially of a layered mineral, comprising:

contacting a substrate comprising a thermoplastic polymer having pendant groups receptive to the layered mineral with a colloidal solution or a colloidal suspension consisting essentially of the layered mineral and a dispersant, wherein the pendant groups receptive to the layered mineral are metal coordinated groups or are groups which can be bonded to coordinating cations or anions or pendant groups which are directly receptive to the layered mineral.

12. The method of claim 11 wherein the metal coordinated group is selected from the group consisting of pendant groups derived from diethyl zinc, zirconium propoxide, aluminum propoxide, calcium ethoxide, iron(III) propoxide, magnesium ethoxide, manganese propoxide, tin(IV) propoxide, and titanium(IV) propoxide.

13. The method of claim 11 wherein the metal coordinated groups are prepared by contacting a thermoplastic polymeric substrate having pendant metal-reactive groups with a solution comprising an alkyl metal or a metal alkoxide for a time sufficient to convert the pendant metal-reactive groups to pendant coordinated metal groups.

14. The method of claim 13 wherein the substrate comprises the thermoplastic substrate poly(ethylene terephthalate) polymerized with lithium sulfonyl isophthalate.

15. The method of claim 11 wherein the layered mineral is selected from the group consisting of hydrotalcite, kaolinite, serpentine, pyrophyllite, smectite, montmorillonite, vermiculite, illite, mica, chlorite, and saponite.

16. The method of claim 11 further comprising pretreating the surface of the substrate with a treatment selected from the group consisting of electrical discharge, flame, plasma, reducing agents, oxidizing agents, metal atoms, metal coordination compounds, and silicateous compounds prior to contact with the layered mineral solution.

17. The method of claim 11 further comprising contacting the surface of the substrate with a solution comprising an amine compound prior to contact of the substrate with the layered mineral solution.

18. A method of reducing the gas permeablility of a thermoplastic polymeric substrate, comprising:

applying a coating consisting essentially of a layered mineral to a thermoplastic polymeric substrate having at least one surface functionalized with pendant groups receptive to the layered mineral, wherein the pendant groups are metal coordinated groups or are groups which can be bonded to coordinating cations or anions or pendant groups which are directly receptive to the layered mineral.

19. A method for packaging a liquid in a molded biaxially oriented polymeric container, comprising the steps of:

forming a container from a thermoplastic polymeric substrate having pendant groups receptive to a layered mineral, wherein the pendant groups are metal coordinated groups or are groups which can be bonded to coordinating cations or anions or pendant groups which are directly receptive to the layered mineral;

applying a coating consisting essentially of the layered mineral to at least one surface of said container;

introducing a liquid into the container; and sealing the container.

* * * * *